(12) United States Patent
Kano et al.

(10) Patent No.: US 9,516,177 B2
(45) Date of Patent: *Dec. 6, 2016

(54) IMAGE DISPLAY APPARATUS, IMAGE DISPLAY METHOD AND IMAGE DISPLAY PROGRAM

(71) Applicant: Sony Corporation, Tokyo (JP)

(72) Inventors: Hirotaka Kano, Kanagawa (JP); Kohei Sakura, Kanagawa (JP); Kyoko Sugizaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,699

(22) Filed: Sep. 23, 2015

(65) Prior Publication Data

US 2016/0014282 A1    Jan. 14, 2016

Related U.S. Application Data

(63) Continuation of application No. 12/237,690, filed on Sep. 25, 2008, now Pat. No. 9,172,828.

(30) Foreign Application Priority Data

Oct. 5, 2007  (JP) .................. 2007-262659

(51) Int. Cl.
*G06F 3/12* (2006.01)
*H04N 1/00* (2006.01)
(Continued)

(52) U.S. Cl.
CPC ...... *H04N 1/00143* (2013.01); *H04N 1/00132* (2013.01); *H04N 1/00161* (2013.01);
(Continued)

(58) Field of Classification Search
None
See application file for complete search history.

(56) References Cited

U.S. PATENT DOCUMENTS

2003/0050842 A1* 3/2003 Wada ............... G06Q 20/20
                                                        705/16
2004/0263906 A1* 12/2004 Uchida ............ H04N 1/00132
                                                        358/1.18
(Continued)

FOREIGN PATENT DOCUMENTS

JP    2003-118210    4/2003
JP    2003-256183    9/2003
(Continued)

OTHER PUBLICATIONS

Japanese Office Examination Report issued in connection with counterpart Japanese Patent Appl. No. 2007-262659 dated Feb. 7, 2012.

(Continued)

*Primary Examiner* — Marivelisse Santiago Cordero
*Assistant Examiner* — Neil R McLean
(74) *Attorney, Agent, or Firm* — Dentons US LLP

(57) ABSTRACT

An image display apparatus connected to a printer, for displaying an image to be printed by the printer, includes display section for displaying taken image data as a thumbnail, control section for generating edited image data by editing the taken image data selected by a user and generating an additional thumbnail of the edited image data, and select section for selecting a taken image displayed on the display means to be edited, an editing operation for the taken image, and a print image. As the taken image is edited, the control means displays the additional thumbnail of the edited image data in addition to a thumbnail of the taken image data on the display means to allow each of the (Continued)

thumbnail and the additional thumbnail to be selected as the print image.

13 Claims, 13 Drawing Sheets

(51) Int. Cl.
*H04N 1/62* (2006.01)
*G06T 5/00* (2006.01)

(52) U.S. Cl.
CPC ..... *H04N 1/00175* (2013.01); *H04N 1/00183* (2013.01); *H04N 1/00188* (2013.01); *H04N 1/00278* (2013.01); *H04N 1/00411* (2013.01); *H04N 1/00442* (2013.01); *H04N 1/00453* (2013.01); *H04N 1/00456* (2013.01); *H04N 1/00458* (2013.01); *H04N 1/00461* (2013.01); *H04N 1/00466* (2013.01); *H04N 1/00482* (2013.01); *H04N 1/624* (2013.01); *H04N 2201/0082* (2013.01); *H04N 2201/0089* (2013.01); *H04N 2201/3266* (2013.01); *H04N 2201/3269* (2013.01)

(56) References Cited

U.S. PATENT DOCUMENTS

| | | |
|---|---|---|
| 2006/0072166 A1 | 4/2006 | Fuchs et al. |
| 2007/0061723 A1 | 3/2007 | Ohga et al. |
| 2007/0201048 A1 | 8/2007 | DeBois |
| 2007/0201052 A1 | 8/2007 | Caine |

FOREIGN PATENT DOCUMENTS

| | | |
|---|---|---|
| JP | 2005-343140 | 12/2005 |
| JP | 2005-343141 | 12/2005 |
| JP | 2006-139505 | 6/2006 |
| JP | 2006-163506 | 6/2006 |
| JP | 2006-174402 | 6/2006 |
| JP | 2006-180411 | 7/2006 |
| JP | 2007-075156 | 3/2007 |
| JP | 2007-243733 | 9/2007 |
| JP | 2007-266782 | 10/2007 |

OTHER PUBLICATIONS

Japanese Office Examination Report issued in connection with counterpart Japanese Patent Application No. 2007-262659 dated Jul. 26, 2011.

* cited by examiner

IMAGE DISPLAY APPARATUS, IMAGE DISPLAY METHOD AND IMAGE DISPLAY PROGRAM

CROSS-REFERENCES TO RELATED APPLICATIONS

This application is a continuation of U.S. patent application Ser. No. 12/237,690, filed Sep. 25, 2008, the entirety of which is incorporated herein by reference to the extent permitted by law. The present document contains subject matter related to and claims priority to Japanese Patent Application No. 2007-262659 filed in the Japanese Patent Office on Oct. 5, 2007, the entire content of which being incorporated herein by reference.

BACKGROUND OF THE INVENTION

Technical Field

The present invention relates to an image display apparatus for displaying an image to be printed, and more particularly to an image display apparatus capable of reading an image from an external storage medium, editing the image, and printing the edited image with a printer apparatus.

Background Art

A print kiosk terminal has been installed and widely used at a public site such as a large scale electric home appliance sales store, a station and a hotel, for printing an image taken with an imaging apparatus such as a digital still camera and a mobile phone with a camera. The print kiosk terminal of this type reads image data from a memory card inserted by a user, and displays a list of thumbnails of the image data on a monitor. The user specifies an image to be printed from the thumbnail images displayed on the monitor as a list, to thereby print it out.

The print kiosk terminal of this type can also designate a print size of each thumbnail image displayed as a list on the monitor and set the number of print copies to print the selected image in the designated size and by the designated number of print copies. The print kiosk terminal can also perform various editions for taken images and can print images corresponding to these editions, the editions including adding a date text, conversion into monochromatic and sepia images, image rotation and trimming, composition of a frame ornamenting a periphery of an image, and the like.

As a taken image is selected from a list of taken images displayed on a monitor and the print size and the number of print copies of each image are determined, the related art print kiosk terminal of this type proceeds to a print order confirmation screen to determine an order and advances to a print process. A user can therefore set print size and the numbers of print copies per each image, by one order operation.

The print kiosk terminal selects a taken image from a list of taken images displayed on the monitor, performs various editions to the selected taken image, and after editions are completed, proceeds to a print order confirmation screen to determine an order and advances to a print operation. Some recent print kiosk terminals can set a plurality of print sizes and a plurality of the numbers of print copies to the edition image. Thus, a user can print one edited image at a plurality of print sizes and by a plurality of the numbers of print copies, by one order operation.

As a taken image is edited, however, although a related art print kiosk terminal can print the edited image at a plurality of print sizes, but it cannot print different edited images by one order operation, cannot print different edited images at each print size, by one order operation, and cannot print a taken image not edited and a taken image edited, by one order operation. It is therefore necessary that after one edited image is printed, an order operation for another edited image or another taken image is performed again from the first.

Reference is made to Japanese Patent Unexamined Publication No. 2003-118210, the entire contents thereof are herein incorporated by reference.

SUMMARY OF THE INVENTION

According to an embodiment of the present invention, it is desirable to provide an image display apparatus, an image display method and an image display program capable of printing both a taken image and an edited image obtained through editions on the taken image such as addition of a print size and addition of a frame and characters and the like, by one order operation, and capable of simplifying a user operation.

According to embodiments of the present invention, there is provided an image display apparatus connected to a printer, for displaying an image to be printed by the printer. The image display apparatus includes display means for displaying taken image data as a thumbnail, control means for generating edited image data obtained by editing the taken image data selected by a user and generating an additional thumbnail of the edited image data, and select means for selecting a taken image displayed on the display means to be edited, an editing operation for the taken image, and a print image. As the taken image is edited, the control means displays the additional thumbnail of the edited image data in addition to a thumbnail of the taken image data on the display means to allow each of the thumbnail and the additional thumbnail to be selected as the print image.

According to embodiments of the present invention, it is desirable to provide an image display method for an image display apparatus connected to a printer, for displaying an image to be printed by the printer. The image display method includes steps of displaying a thumbnail of taken image data on display means, making control means generate edited image data by performing the selected edit operation for the selected taken image data when select means selects the thumbnail of the taken image data to be edited and an edit operation, and making the control means display a thumbnail of the edited image data in addition to the thumbnail of the taken image data on the display means to allow both the thumbnails to be selected as a print image.

According to embodiments of the present invention, it is desirable to provide an image display program for making control means of an image display apparatus connected to a printer, for displaying an image to be printed by the printer, execute steps of displaying a thumbnail of taken image data on display means, making the control means generate edited image data by performing the selected edit operation for the selected taken image data when select means selects the thumbnail of the taken image data to be edited and an edit operation, and making the control means display a thumbnail of the edited image data in addition to the thumbnail of the taken image data on the display means to allow both the thumbnails to be selected as a print image.

According to embodiments of the present invention, the additional thumbnail of the edited image data obtained by subjecting the taken image data to various editions is displayed together with the thumbnail of the taken image data to allow both the thumbnail and additional thumbnail to be selected as the print image. Accordingly, the print size and the number of print copies can be set for both the thumbnail of the taken image data and the additional thumbnail of the edited image data, and both the thumbnails can be printed by one order operation.

DETAILED DESCRIPTION OF THE EMBODIMENTS

An image display apparatus of embodiments of the present invention will now be described in detail with reference to the accompanying drawings. The image display apparatus is used with a print system applied to a print kiosk terminal which is installed at a public site such as a station and a hotel and provides services of printing image data stored in a removable storage medium such as a memory card provided by a user. Since a photograph is printed, the print system uses a sublimation type thermal transfer printer excellent in color reproduction, as a printer apparatus.

Figure 1:
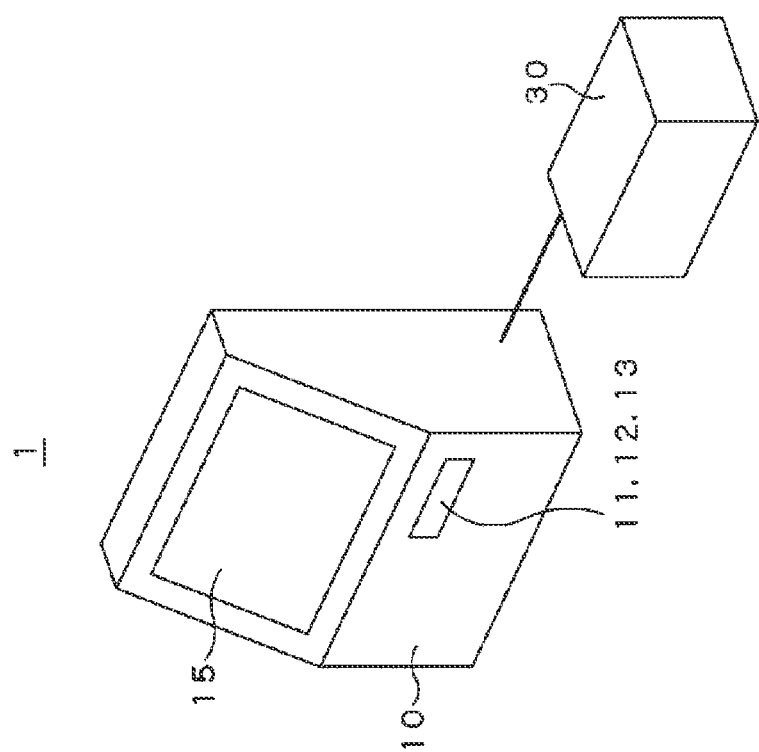
FIG. 1 is a perspective view of a print system to which the present invention is applied.

As shown in FIG. 1, a print system 1 to which the present invention is applied includes an image display apparatus 10 and a printer apparatus 30 for printing an image selected with the image display apparatus 10. The image display apparatus 10 is used for inputting image data from a removable recording medium such as a memory card, and displaying, selecting and editing image data to be printed. For example, the image display apparatus 10 and printer apparatus 30 are connected by wires or wireless, and installed such that the apparatuses are adjacent each other or assembled in the same housing.

Figure 2:
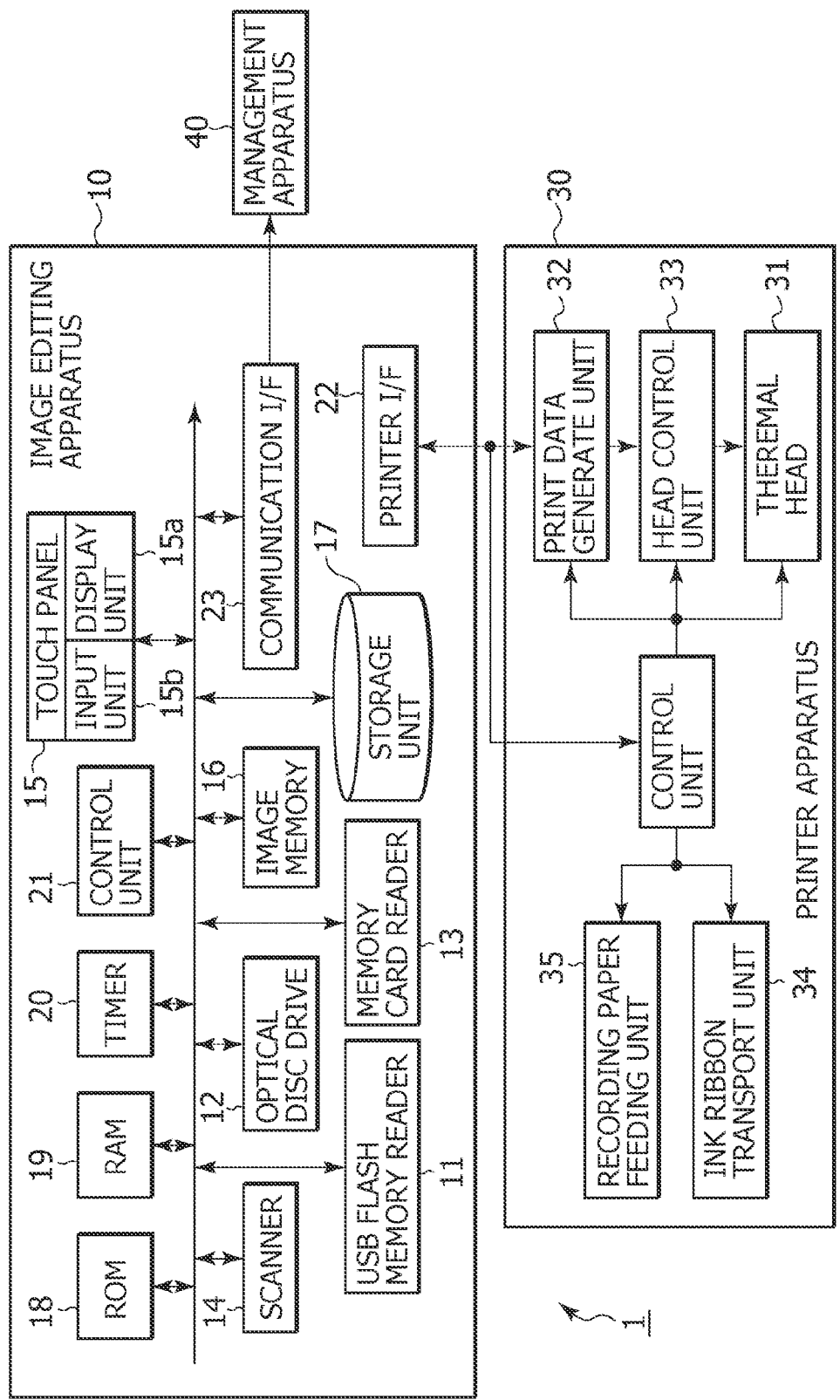
FIG. 2 is a block diagram of the print system.

As shown in FIG. 2, the image display apparatus 10 constituting the print system 1 has various drives for reading a removable recording medium provided by a user. Specifically, the image display apparatus has a universal serial bus (USB) flash memory reader 11 for reading image data stored in a storage device using a semiconductor memory such as a flash memory as a storage device, via a USB interface, an optical disc drive 12 for reading image data from an optical disc such as a compact disc (CD) and a digital versatile disk (DVD), a memory card reader 13 for reading image data stored in a storage device from a memory card which use a semiconductor memory such as a flash memory as a storage device, and a scanner 14 for optically reading a photograph provided by a user.

The image display apparatus 10 also includes a touch panel 15 for displaying image data inputted from the USB flash memory reader 11, optical disc drive 12, memory card reader 13 or scanner 14 and being operated by a user, a image memory 16 for temporarily storing image data to be displayed on the touch panel 15, a storage unit 17 for storing log data such as the number of print copies and the number of use times of a template such as a frame to be formed at the periphery of image data when the image is printed, a ROM 18 for storing a control program for the entire operation, a template such as a frame ornamenting image data, a table of characters and symbols to be added to image data, and a color table, a RAM 19 to which a control program, a template such as a selected frame, and the like are temporarily loaded, a timer 20 for measuring a predetermined time, and a control unit 21 for controlling the entire operation in accordance with a control program and a command signal entered by a user.

The image display apparatus 10 has also the printer apparatus 30, a printer I/F 22 for outputting image data to be printed and a communication I/F 23 for making communications with an external management apparatus 40 via a network, e.g., the Internet.

The touch panel 15 has a display unit 15a for displaying image data and the like and an input unit 15b for generating an operation signal upon operation by a user. The touch panel 15 detects a position where a finger or a dedicated pen touches the screen when a finger or a dedicated pen touch the screen, designates the position on the screen, and inputs an operation signal to the control unit 21. Specifically, a position on the screen is identified by sensing a change in pressure or an electric signal generated by static electricity to generate an operation signal.

For example, the touch panel 15 displays a plurality of image data stored in a USB flash memory, optical disc, and a memory card and the like in thumbnail form, and allows a user to select one or more displayed thumbnail images. The touch panel 15 also allows a user to select a plurality of frames to be synthesized with image data of a selected thumbnail image, and characters and character colors to be added to each frame.

The image memory 16 stores image data to be displayed on the touch panel 15. For example, when the processing treatment of the selected image data, such as zoom processing, processing of moving a zoom area, processing of rotating image data, processing of adding text data such as characters, processing of synthesizing with a frame, the image data stores image data after processing treatment and outputs the processed image data to the touch panel 15.

The storage unit 17 is constituted of a hard disk or the like and records print log data, or the like. For example, the storage unit 17 stores, as log data, the number of selected frames to be synthesized with image data, the number of print copies and the like. This log data is transmitted to the management apparatus 40 so that not only an administrator can use the log data for reference to a preference degree or the like of a template such as a frame, but also a user can use the log data for displaying a popular template preferentially on a template select screen when a template such as a frame is selected. The log data may be stored in the removable recording medium mounted on the USB flash memory reader 11, optical disc drive 12, memory card reader 13 and the like. The storage unit 17 also stores data of a frame or the like.

ROM 18 may be an erasable programmable read-only memory (EP-ROM) or the like, and stores a browser for displaying read image data by thumbnails form, a program for processing image data and the like. These various programs are read into RAM 19 in response to a operation signal.

The timer 20 measures a time and a predetermined time. For example, with this timer 20, the log data is stored in the storage unit 17 in association with a print time or the like. The number of print copies and the number of selection frequencies during a predetermined period, e.g. during one month, are counted.

The control unit 21 may include a CPU or the like, and performs a predetermined computing process in accordance with a program in response to a operation signal or the like.

For example, the control unit 21 sets a select state to selected image data and performs processing to change the display state thereof, when a predetermined unit image is selected with the touch panel 15, and as a operation signal for processing selected image data is issued, in accordance with the operation signal, processing, such as zoom processing, processing of moving a zoom area, processing of rotating image data, processing of adding text data such as characters, and processing of synthesizing with a frame are performed to the selected image data.

The printer I/F 22 is connected to the printer apparatus 30 via wires or wireless, and outputs image data to be printed, to the printer apparatus 30. The communication I/F 23 is connected to, for example, the management apparatus 40 via a network, e.g., the Internet. For example, the communication I/F 23 transmits log data or the like stored in the storage unit 17 to the management apparatus 40 in accordance with a predetermined protocol such as TCP/IP.

As shown in FIG. 2, the printer apparatus 30 connected to the image display apparatus 10 via the printer I/F 22 has a thermal head 31 for forming a color image on standard paper by sublimating dye in an ink ribbon, a print data generator unit 32 for generating print data to be printed from image data inputted from the printer I/F 22 of the image display apparatus 10, a head control unit 33 for drive controlling the thermal head 31, an ink ribbon transport unit 34 for transporting an ink ribbon, and a recording paper feeding unit 35 for transferring recording paper.

The thermal head 31 has a plurality of heat generating elements disposed linearly along a width direction of a paper roll or the like, and making a plurality of heat generating elements selectively generate heat by supplying drive current corresponding to print data to the heat generating elements. The thermal head 31 faces a platen, pressure-contacts an ink ribbon against recording paper, sublimates dye or the like by applying heat energy from the ink ribbon side to transfer the dye to the recording paper.

The print data generator unit 32 converts image data into print data. Specifically, the print data generator unit 32 performs a color conversion process of converting image data into a YMC color space of ink colors, and a predetermined process such as a gamma conversion process of matching chromogenic characteristics of roll paper. The head control unit 34 generates a drive signal for the thermal head 31 in accordance with print data generated by the print data generator unit 32, and supplies the drive signal to the thermal head 31 to drive and control the thermal head 31 in accordance with image data to be printed. Processes to be performed by the print data generator unit 31 may be performed by the image display apparatus 10, and the generated print data may be outputted to the printer apparatus 30.

The ink ribbon transport unit 34 transports an ink ribbon wound around a supply reel and a winding reel to a ribbon cartridge. For example, the ink ribbon has yellow, cyan, magenta and laminate films disposed in this order, frame sequentially along a transport direction, and one photograph is formed on recording paper by a set of yellow, cyan, magenta and laminate films.

The recording paper feeding unit 35 has a transfer roller, a plurality of drive rollers and the like, and feeds recording paper such as roll paper from a paper feed unit to a paper eject unit via the thermal head 31. In order to form an image, it is necessary to sequentially transfer the yellow, cyan, magenta and laminate films on recording paper. Therefore, the recording paper feeding unit 35 first thermally transfer yellow on recording paper by synchronously transferring the recording paper with the ink ribbon, then transfers the recording paper in a reverse direction to align a paper top position to thereafter thermally transfer cyan on yellow, and further transfers the recording paper in a reverse direction to align a paper top position to thereafter thermally transfer magenta on cyan. This operation is repeated so that thermal transfer on the recording paper can be achieved in the order of the yellow, cyan, magenta and laminated films.

Figure 3:
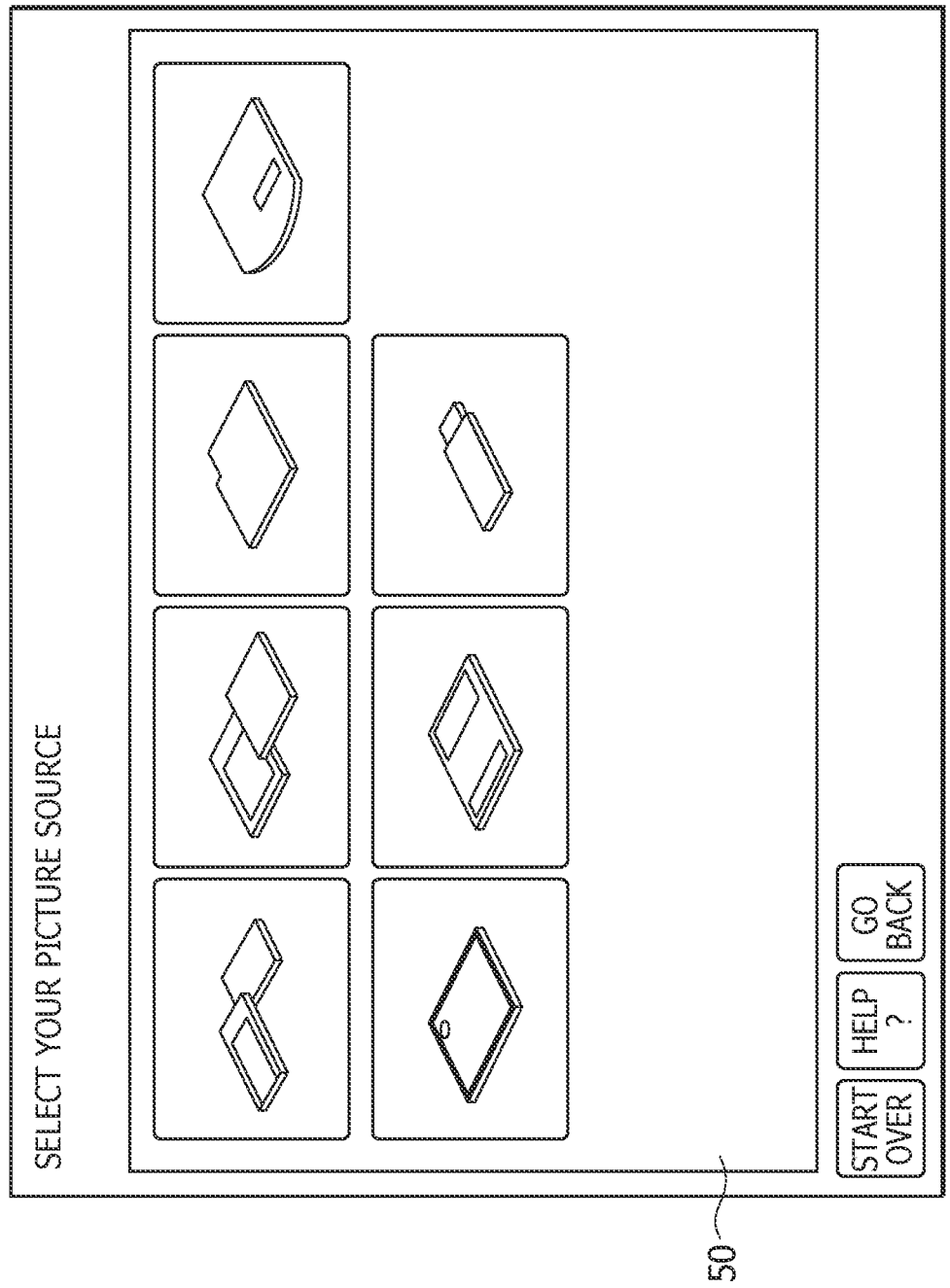
FIG. 3 is a diagram showing a media select screen.

Next, description will be made on a process of, in the printer system 1 to which the present invention is applied, reading taken image data from a removable recording medium provided by a user, editing the taken image data to be printed to generate edited image data, and displaying thumbnails of the edited image data on the touch panel 15. In an operation stand-by state of the image display apparatus 10, a stand-by screen (not shown) is displayed on the display unit 15a of the touch panel 15. As a start button displayed on the stand-by screen is touched, a media select screen 50 shown in FIG. 3 is displayed.

The media select screen 50 is used for selecting a medium from which image data and print data are read. A medium can be designated by touching an icon representative of each of a USB memory, an optical disc and various memory cards mounted on the USB flash memory reader 11, optical disc drive 12, and memory card reader 13.

Figure 4:
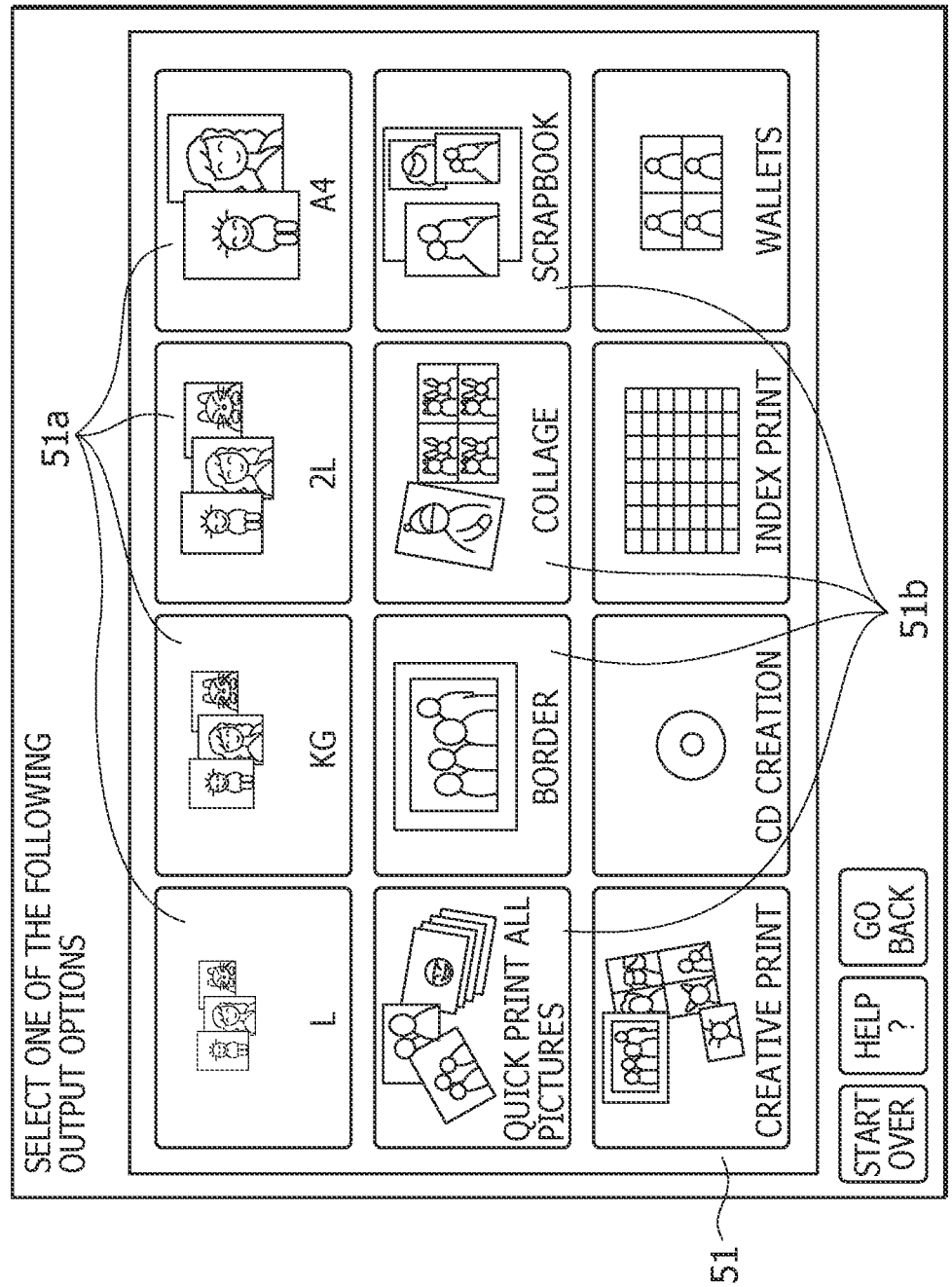
FIG. 4 is a diagram showing a print menu screen.

When a medium from which image data is read is selected, a print menu screen 51 as shown in FIG. 4 is displayed on the display unit 15a. The print menu screen 51 is used for selecting a print method for read image data. For example, the print menu screen displays print size select icons 51a representative of an L size (127 mm×89 mm), a KG size (152 mm×102 mm), a 2 L size (178 mm×127 mm) and an A4 size (297 mm×210 mm) and special menu icons 51b such as "Quick Print All Pictures", "Border", "Collage" and "Scrapbook".

The print size select icons 51a are used for deciding a print size. The control unit 21 sets the selected size as a default size, and prints the selected image data at the default size set with the print size select icon 51a unless a user does not perform a size change operation for each image data.

Out of the special menu icons 51b, the "Quick Print All Pictures" icon is used for settings of printing all read image data. The "Border" icon is used for settings of ornamenting read image data with a template such as various frames. The "Collage" icon is used for cutting a portion or the whole of read image data and pasting it to other read image data to constitute and edit one print image. The "Scrapbook" icon is used for printing through various editions such as cutting a portion of read image data and pasting it together with other image data to one print image.

Other special menu icons 51b to be displayed include "Creative Print" for performing editions such as above-described "Border", "Collage" and "Scrapbook" for each image data, "CD creation" for recording image data on an optical disc such as CD-R, "Index Print" for printing an image by displaying a list of all images, and the like. Sizes of the print size select icons 51a and the menus of the special menu icons 51b can be added, changed or deleted as desired.

When any one of the print size select icons 51a is touched, the control unit 21 of the image data display apparatus 10 reads taken image data stored in the removable storage medium already designated to display thumbnails thereof on the display unit 15a of the touch panel 15, and stores the read image data in the image memory 16. The control unit 21 displays on the display unit 15a thumbnails of the taken image data read from the video memory 16 on a print image select screen 52 shown in FIG. 5, in a predetermined order, e.g., in the order of most recent photographing date/time.

If print data of a digital print order format (DPOF) (registered trademark) or the like relating to taken image data is stored in the memory card, the control unit 21 may read also this print data to preferentially display thumbnails of the taken image data having this print data. A user can therefore view the taken image data starting from the taken image data having a high print possibility, and can effectively find the taken image data desired to be printed, from a large amount of taken image data stored in the memory card.

As the taken image data is displayed as thumbnails in the manner described above, an image to be actually printed is selected by touching the corresponding thumbnail of the taken image data, and edition works are performed such as setting the number of print copies, setting a print size, and synthesizing image frames and characters. Description will now be made on the print image select screen 52 shown in FIG. 5 on which thumbnails of the taken image data are displayed. The print image select screen 52 displays: thumbnails display area 61 where thumbnails of the taken image data are displayed; a print size display area 62 for displaying a print size selected with the print menu screen; an edit button 63 for transiting to a print image edit screen 90 with which an image regarding a designated thumbnail is ornamented; a size addition button 64 for designating a print size other than print size displayed in the print size display area 62; a size information display area 65 where a list of the numbers of print copies for each size is displayed; print copy number determining buttons 66 for increasing/decreasing in a unified manner the number of print copies of a selected print image; an automatic color correction button 67 for executing in a unified manner automatic color correction of a selected print image; a page forward button 68 for changing a page if the print image select screen 52 is displayed over a plurality of pages; a return button 69 for returning to the print menu screen 51, a select completion button 70 for transiting to an order confirmation screen after completion of selection of a print image on the print image select screen 52; a date display button 71 for displaying in a unified manner a print date/time on a photograph of a selected print image; a media select button 72 for reading data from other media; and a help button 73 for use when an operation cannot be known.

Figure 5:
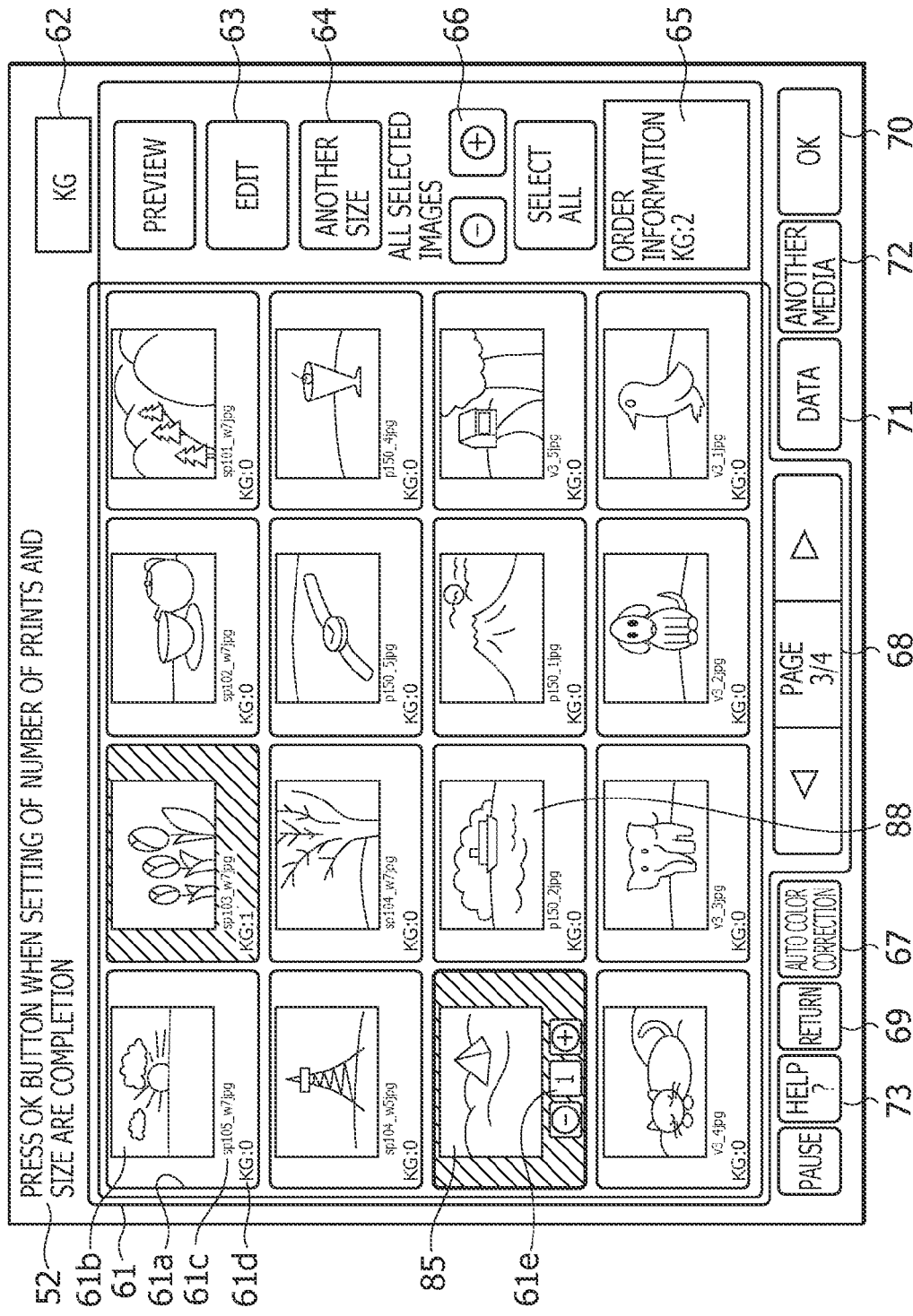
FIG. 5 is a diagram showing a print image select screen on which thumbnails of taken images are displayed.

Taken image data read from the memory card is sequentially displayed in the order of recent photograph date/time in the thumbnail display area 61. The thumbnail display area 61 is partitioned by displaying a display frame 61a for each taken image. For example, as shown in FIG. 5, sixteen taken images are displayed by four rows and four columns. Each display frame 61a displays a thumbnail 61b, an image data name 61c, and a print size and print copy number 61d.

As a user designates a taken image desired to be printed by touching the corresponding thumbnail, the control unit 21 sets the designated taken image to a select state by displaying the display frame of the thumbnail thicker than those of other display frames, changing a background color of the frame and displays print copy number setting buttons 61e including + and − buttons for increasing/decreasing the number of print copies. As the thumbnail is designated, the image display apparatus 10 performs editions of the taken image of the designated thumbnail, such as changing a print size and synthesizing with frames and characters. Specifically, as the edit button 63 is touched in the thumbnail designated state, the control unit 21 operates to transit to a print image edit screen 90 for ornamenting an image regarding the designated thumbnail, whereas as the size addition button 64 is touched, the control unit operates to transit to an additional size select dialog 80 for adding a print size other than print size selected with the print menu screen 51 for the designated thumbnail. This edit process for a taken image will be later described in detail. As the thumbnail is designated, the control unit 21 automatically sets "1" to the number of print copies of the image corresponding to the designated thumbnail image, and as the + or − button of the print copy number setting buttons 61e is touched, the number of print copies is increased/decreased in accordance with the number of touch times.

Next, as another thumbnail is touched, the thumbnail designated previously while maintains a select state in which background color is changed, the print copy number setting bottoms 61e disappear and instead, the print size and print copy number 61d is displayed. The thumbnail in the select state is set with a print copy number "1" unless the print copy number is changed with the print copy number setting buttons 61e. Namely, a user designates the taken image by touching the corresponding thumbnail in the print image select screen 52 to sequentially select a print image, whereby the thumbnail in the selected state can always be confirmed. Moreover, since the print image select screen 52 displays the print copy number setting buttons 61e for the thumbnail presently designated (presently selected), the user can know at once which thumbnail is presently selected.

In the printer system 1, an image regarding the thumbnail selected with the print image select screen 52 is printed with the printer apparatus 30. Therefore, an image corresponding to the thumbnail entered the select state changes from a taken image to a print image to distinguish from a thumbnail not in the select state. In order to release the select state, the thumbnail may be selected and a print copy number indicated by the print copy number setting buttons 61e is set to "0". In this case, "0" is displayed as the print size and print copy number 61d, and the background of the display frame 61a returns to original state.

According to embodiments of the present invention, for a print image selected with the print image select screen 52, a print size different from the default size displayed in the print size display area 62 can be selected by touching the size addition button 64 in the thumbnail designating state. If the print size different from the default size is selected for the print image, the control unit 21 generates edited image data cut at an aspect ratio corresponding to the selected print size, and additionally displays a thumbnail of this edited image data in the thumbnail display area 61.

In the following, a thumbnail of a taken image is called an original thumbnail, and a thumbnail additionally displayed in the thumbnail display area 61 upon selection of a size different from the default size of the original thumbnail is called an additional thumbnail. The additional thumbnail is displayed adjacent to the original thumbnail. For the additional thumbnail, the print size and print copy number 61*d* at the selected size is written in the display frame 61*a*. In the additional thumbnail designated state, it is difficult to display an additional thumbnail at a print size different from that of the additional thumbnail, by touching the size addition button 64.

Figure 6:
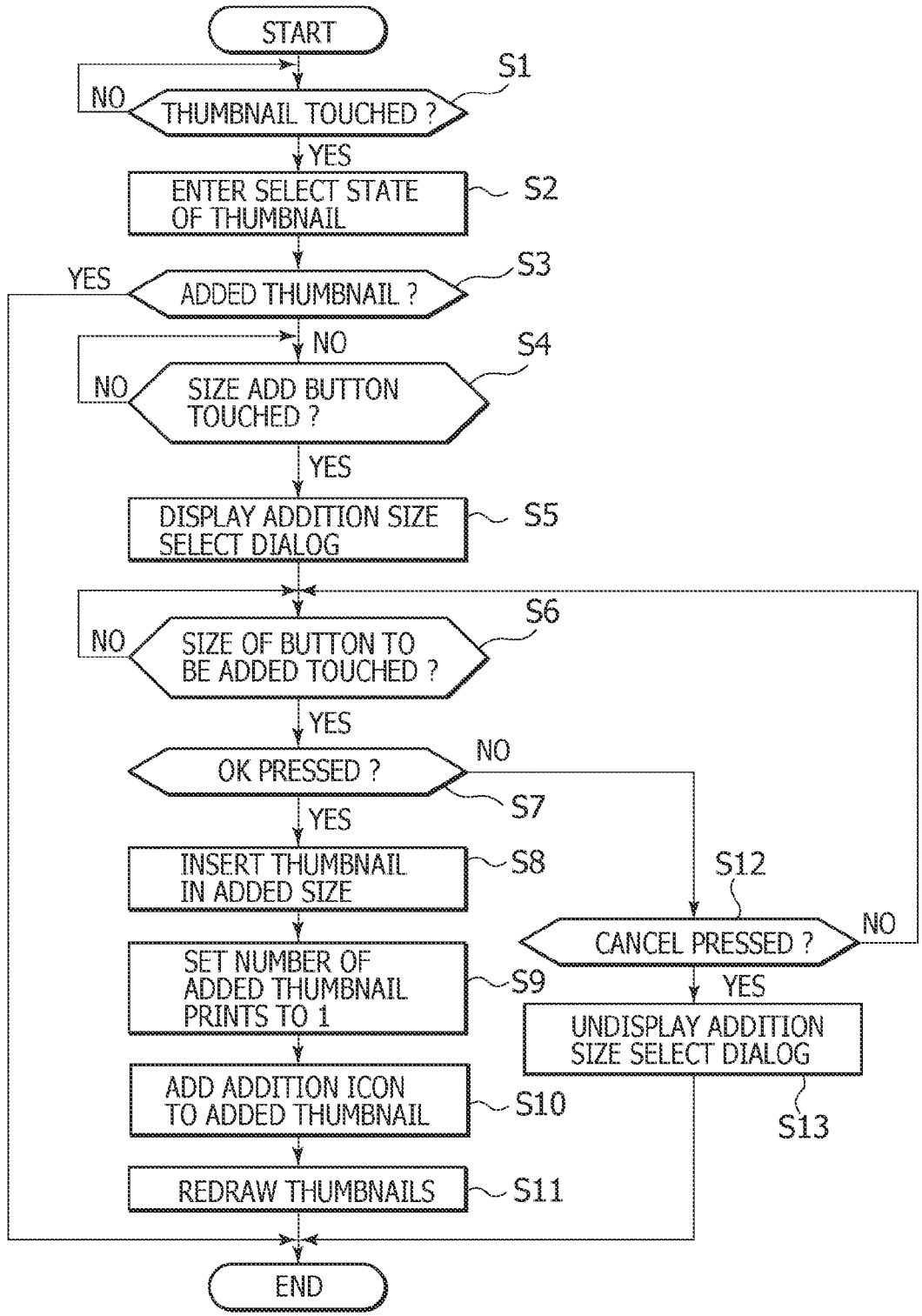
FIG. 6 is a flow chart illustrating processes of displaying an additional thumbnail when a print size different from a default size is designated.

With reference to the flow chart of FIG. 6, description will be made on the process of additionally displaying an additional thumbnail with a different print size in the thumbnail display area 61. At Step S1, in the state that a list of thumbnails of the taken image data is displayed on the print image select screen 52, as a user touches a thumbnail, the background color of the display frame 61*a* of the thumbnail is changed at Step S2 to enter the designated state. As described above, in the designated state, the print copy number setting buttons 61*e* are displayed in the thumbnail display frame 61*a*. In this case, the control unit 21 judges at Step S3 whether the designated thumbnail is an additional thumbnail, and if it is the additional thumbnail, does not receive a operation other than a change in the print copy number by the print copy number setting buttons 61*e*.

Figure 7:
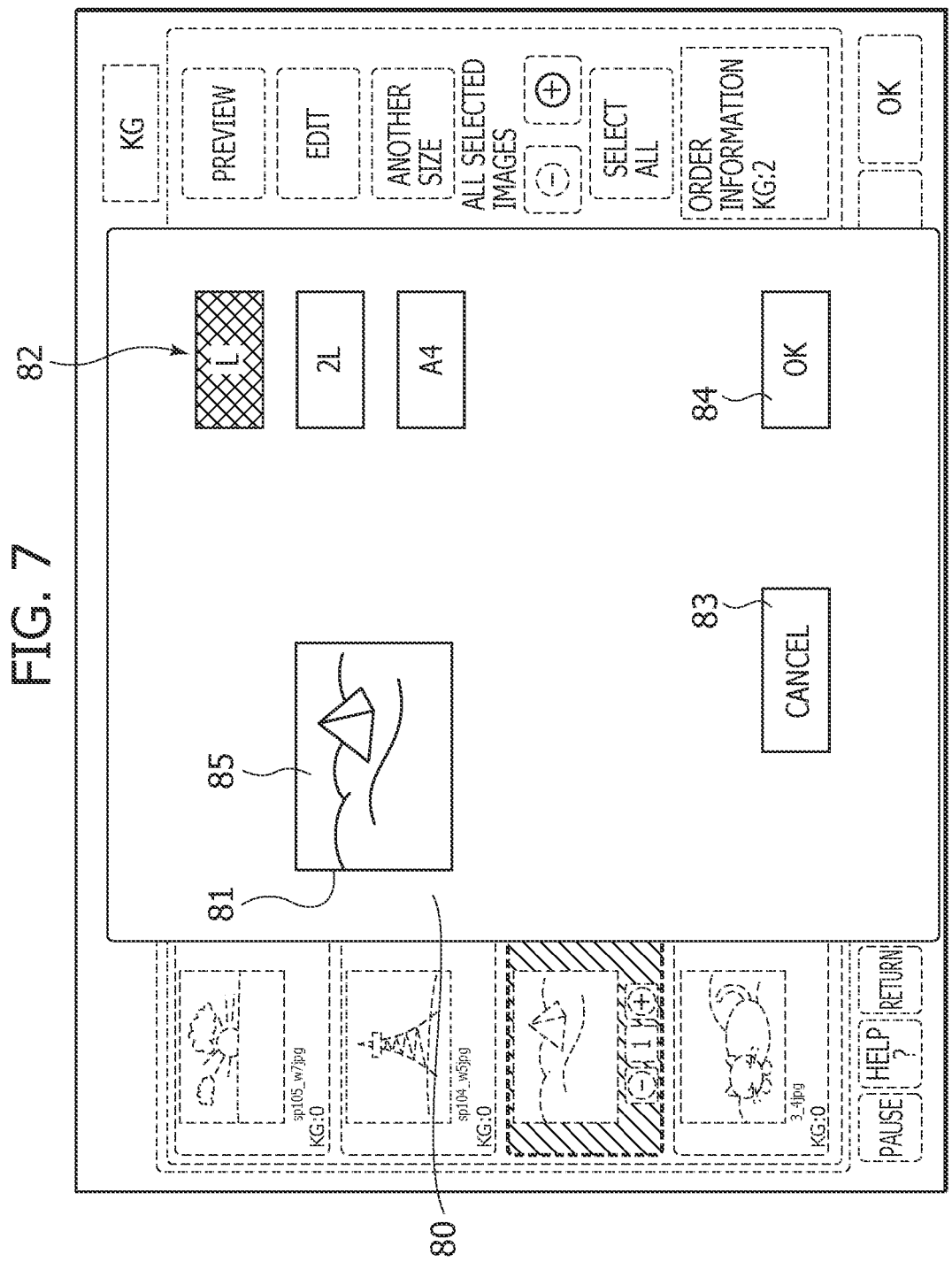
FIG. 7 is a diagram showing an additional size select dialog.

If the designated thumbnail is an original thumbnail by which a taken image is displayed and a size addition button 64 is touched at Step S4, an additional size select dialog 80 shown in FIG. 7 is displayed on the touch panel 15. The addition size select dialog 80 has an original thumbnail display area 81 for displaying the designated original thumbnail, size icons 82 representative of candidates of an image size capable of being added, a cancel icon 83 for canceling the size addition process, and an OK icon 84 for selecting the size and returning to the print image select screen 52.

Figure 8:
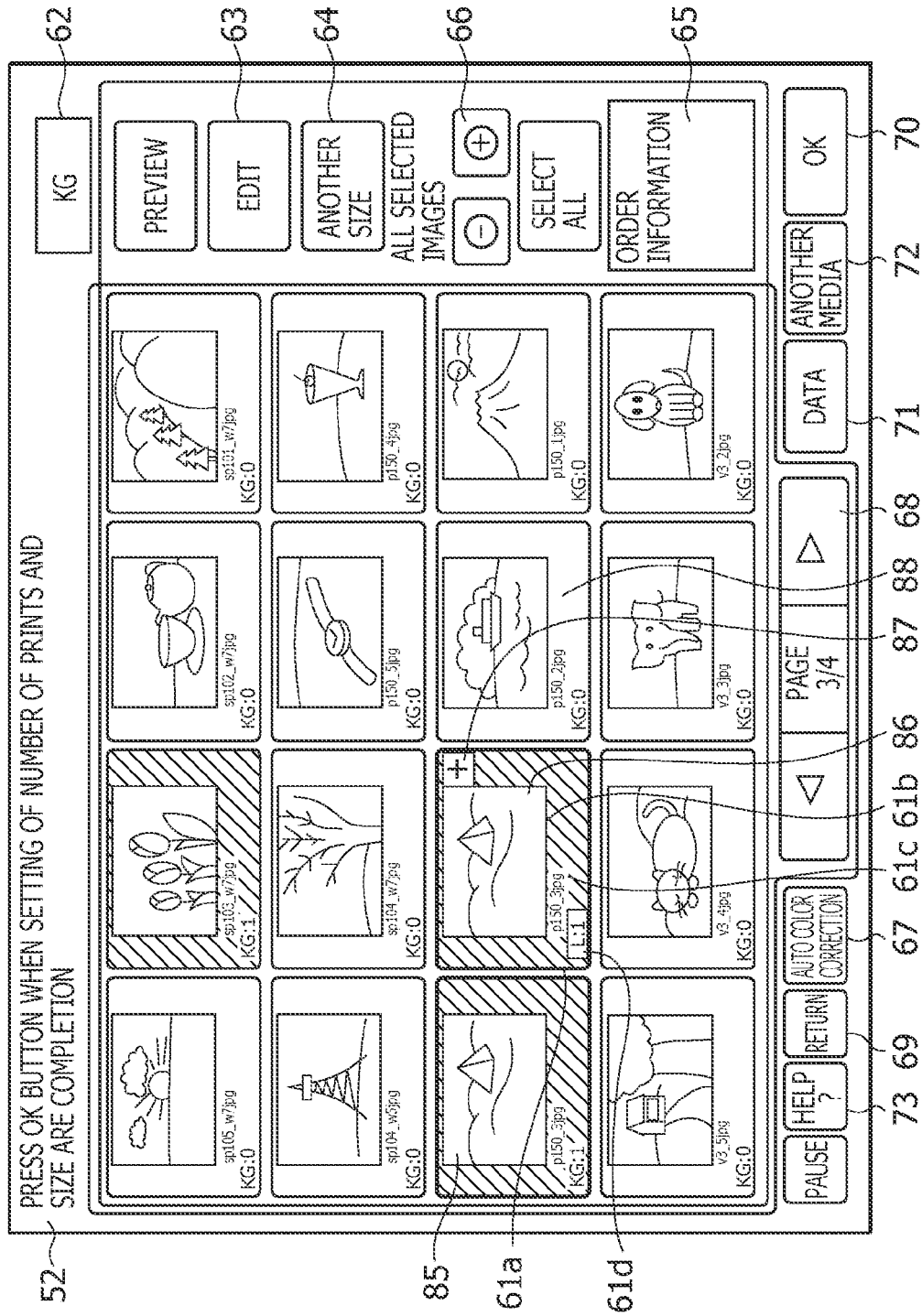
FIG. 8 is a diagram showing a print image select screen on which additional thumbnails having different print sizes are displayed.

At Step S6 as the size icon 82 displaying the size a user desires to change is touched, a color of the touched size icon 82 changes to enter the select state. In the example of FIG. 7, the L size is selected. At Step S7 as a user touches the OK icon 84, the control unit 21 deletes the additional size select dialog 80 from the touch panel 15 and returns to the print image select screen 52. In this case, at Step S8 the control unit 21 generates edited image data by cutting the taken image data at an aspect ratio of the additionally selected print size, and stores the edited image data in the image memory 16 in such a manner that the additional thumbnail 86 of edited image data can be displayed adjacent to the original thumbnail 85, as shown in FIG. 8.

Next, at Step S9 the control unit 21 sets the number of print copies of the additional thumbnail 86 to "1". Next, at Step S10 the control unit 21 adds an addition icon 87 representative of that the thumbnail is the additional thumbnail, in the display frame 61*a* of the additional thumbnail 86. At Step S11, as shown in FIG. 8, the control unit 21 displays the additional thumbnail 86 stored in the image memory 16 in the thumbnail display area 61 of the print image select screen 52 such that the thumbnail is adjacent to the original thumbnail 85, and at the same time sets the select state. If the additional thumbnail 86 is to be displayed in the next page, the control unit 21 displays the next page of the print image select screen 52.

As similar with the original thumbnail 85, the additional thumbnail 86 has a thumbnail 61*b* and an image data name 61*c* displayed in the display frame 61*a*, and the print size and print copy number 61*d* at the selected size (L size) selected with the additional size select dialog 80 is also displayed. Since an addition icon 87 is displayed in the display frame 61*a* for the additional thumbnail 86, a user can know easily that the thumbnail is the one added later.

The select state of the original thumbnail 85 is maintained and also the print size and print copy number is not changed.

Since the additional thumbnail 86 is displayed adjacent to the original thumbnail 85, a thumbnail 88 displayed previously adjacent to the original thumbnail 85 is shifted right by one and displayed adjacent to the additional thumbnail 86, and thumbnails adjacent to the thumbnail 88 are sequentially shifted to right or displayed in the lower rows, and the last thumbnail is shifted to the next page. The size designated for the additional thumbnail 86 is additionally displayed in the size information display area 65.

If the OK icon 84 is not touched at Step S7 but the cancel icon 83 is touched at Step S12, the additional size select dialog 80 is not displayed at Step S13 and the flow returns to the print image select screen 52 shown in FIG. 5.

When a select completion button 70 is touched after selecting a print image and setting the number of print copies and a print size with the print image select screen 52, the control unit 21 counts the number of print copies and its fee for each print size for the print image corresponding to the thumbnail in the select state, and displays the order confirmation screen together with the total fee on the touch panel 15. As an OK button is touched on the order confirmation screen, the control unit 21 transmits image data of the selected print image to the printer apparatus 30, and the control unit of the printer apparatus generates print data in accordance with the image data. Thereafter, the printer apparatus 30 drives the thermal head 31, ink ribbon transport unit 34 and recording paper transfer unit 35 based on print data, and prints a photograph on paper of a designated size in accordance with the taken image data and edited image data.

In this manner, the image display apparatus 10 displays the additional thumbnail 86 such that the thumbnail is adjacent to the original thumbnail 85, and the print copy number setting buttons 61*e* are displayed in both the original thumbnail 85 and additional thumbnail 86 which are under designation. It is therefore possible to set the number of print copies which are different per each size. Thus, the image display apparatus 10 can therefore set the number of print copies for each print image and for each different size by one order operation.

Next, description will be made on a process of editing by ornamenting a print image designated with the print image select screen 52 and displaying edited image data as an additional thumbnail. In the state that a list of thumbnails of taken image data is displayed on the print image select screen 52, as the edit button 63 is touched in the designation state of a thumbnail to be edited, the image display apparatus 10 can perform various ornamentation operations for the taken image. As the print image data is ornamented, the control unit 21 generates edited image data obtained by synthesizing the taken image with various ornamentations in the thumbnail display area 61 of the print image select screen 52, and additionally displays the thumbnail of the edited image data on the touch panel 15. The image display apparatus 10 can therefore print images corresponding to the original thumbnail and edited additional thumbnail at different print sizes and by the different numbers of print copies, by one order operation.

In the following, a thumbnail of taken image data to be ornamented is called an original thumbnail, and a thumbnail additionally displayed in the thumbnail display area 61 upon ornamentation of the taken image data is called an additional thumbnail. The additional thumbnail is displayed such that the thumbnail is adjacent to the original thumbnail. If the edit button 63 is touched in the additional thumbnail designated state and edited image data corresponding to the additional thumbnail is further edited, an additional thumbnail different from the additional thumbnail will not be additionally displayed, but the edit content added to the edited image data is reflected, i.e., so-called overwrite is performed, and an additional thumbnail of edited image data after overwrite is displayed.

Figure 9:
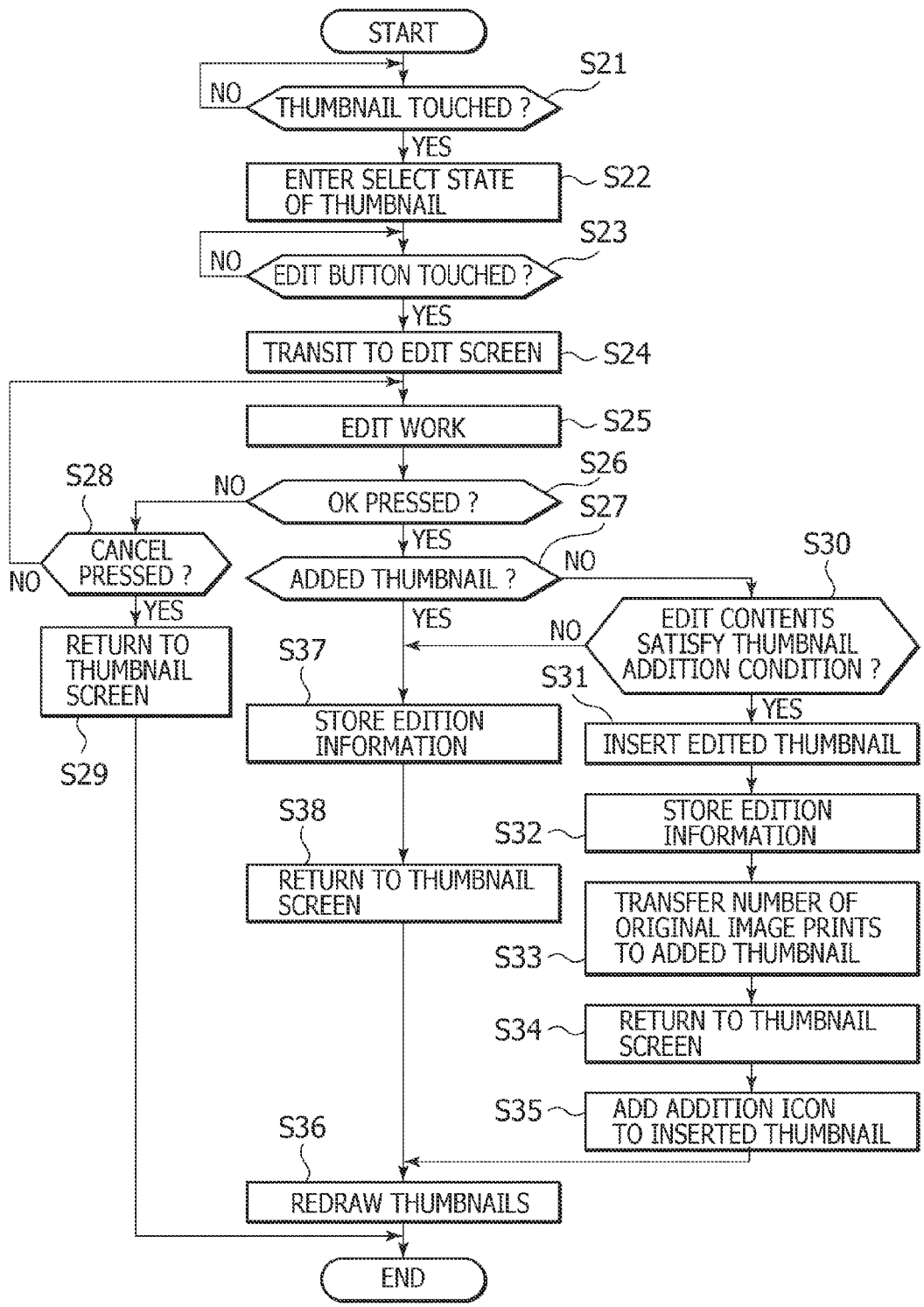
FIG. 9 is a flow chart illustrating processes of displaying an additional thumbnail when a print image is edited.

With reference to the flow chart of FIG. 9, description will be made on the process of additionally displaying an additional thumbnail of edited image data which is subjected to various ornamentations in the thumbnail display area 61. At Step S21 in the state that a list of thumbnails of taken image data is displayed on the print image select screen 52, as a user designates a thumbnail by touching it, the background color of the display frame 61*a* of the thumbnail is changed at Step S22 to enter the select state. As described earlier, in the designated state, the print copy number setting buttons 61*e* are displayed in the thumbnail display frame 61*a*.

Figure 10:
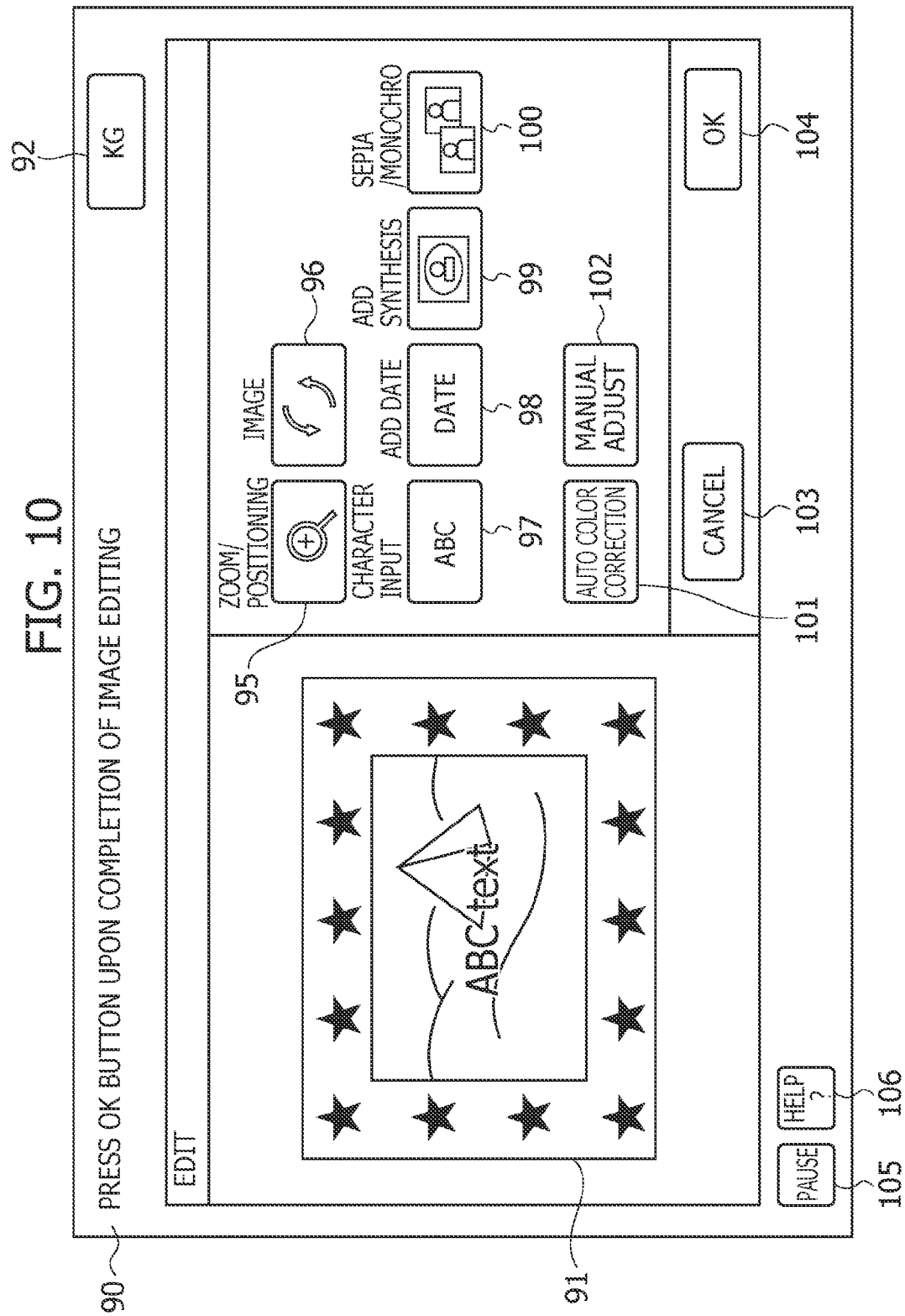
FIG. 10 is a diagram showing a print image edit screen.

The control unit 21 judges at Step S23 whether the edit button 63 is touched or not. If touched, the screen transits to the print image edit screen 90 shown in FIG. 10 at Step S24. The print image edit screen 90 has an original thumbnail 85 in the designated state, a photograph display area 91 which displays synthesized frame stored beforehand in ROM 18 and a text or the like added by a user, a size display area 92 for displaying a default size selected with the print menu screen 51 and edit tool buttons for performing various editions.

The edit tool buttons include a zoom button 95 for zooming a print image, a rotation button 96 for rotating a print image, a text addition button 97 for adding a text to a print image, a date addition button 98 for adding a photographed date to a print image, a frame synthesizing button 99 for synthesizing a frame ornamenting a periphery of a print image, a conversion button 100 for conversion of a printed photograph between a monochromatic color and a sepia color, an automatic correction button 101 for automatically correcting a red eye or the like, and a manual correction button 102 for manual correction. The buttons used for edition may be added and changed as desired.

The print image edit screen 90 has also a cancel button 103 for canceling edition, an OK button 104 for returning to the print image select screen 52 after completion of edition, a discontinuation button 105 for discontinuing printing, and a help button 106 used when an operation cannot be known.

Figure 11:
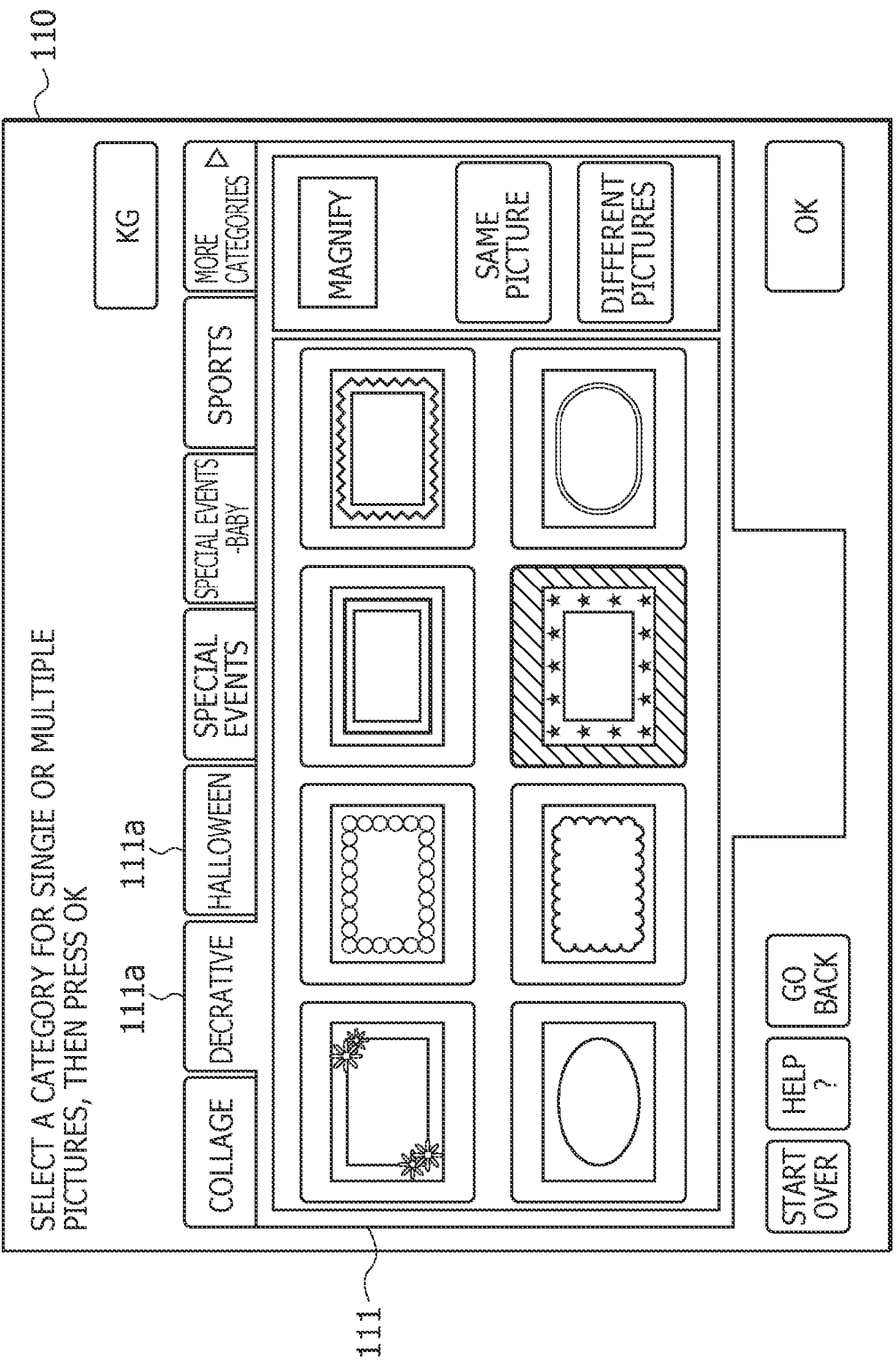
FIG. 11 is a diagram showing a frame selection screen.

At Step S25 the designated print image is edited. For example, as the frame synthesizing button 99 is touched, the control unit 21 transits a display of the touch panel 15 to a frame select screen 110 shown in FIG. 11. The frame select screen 110 displays a plurality of various frame images in each frame display sheet 111. The frame display sheets 111 are classified in accordance with a design type and has tabs 111*a* indicating a design type. As the tab 111*a* is touched, a frame display sheet 111 displaying other frame designs can be displayed.

As frame design types, there are prepared "Decorative" for displaying decorative frames, "Halloween" for displaying frames having motifs of Halloween. "Special Events" for displaying frames having motifs of Christmas, new year, birthday, marriage and the like, "Special Events-Baby" for displaying a frame suitable for an event, particularly a birth event, "Sports" for displaying a frame having a motif of Sports, and the like. The types of frame display sheets for displaying these various frames per each design type may be added, changed and deleted as desired.

The frame select screen 110 also displays a "Start Over" icon for returning to an initial screen, a "Go Back" icon for returning to the print image edit screen 90 and a "Help ?" icon to be used when the operation cannot be known.

As a user selects a frame to be used by touching the frame screen, a display frame of the frame becomes thicker than those of other display frames or a background color of the display frame of the frame is changed from those of other display frames, to enter the select state. In this select state, as the "OK" icon is touched, the control unit 21 returns a display of the touch panel 15 to the print image edit screen 90, generates edited image data obtained by synthesizing the selected print image and the selected frame, stores the edited image data in the image memory 16, and displays the synthesized image in a photograph display area 91.

As the text addition button 97 is touched, a key pad (not shown) is displayed to allow a user to enter a desired text. The key pad displays in a switching manner hiragana, katakana, kanji, alphabets, numerals and symbols. Ornamentation such as fonts and character colors may be made as desired.

Edited image data formed by using these various editing tool buttons is stored in the image memory 16 and displayed in the photograph display area 91. In the example shown in FIG. 10, the zoom process, frame synthesizing process and text addition process are executed for the original thumbnail 85. As the editions of the print image are completed, the user touches the OK button 104 to return to the print image select screen 52. The control unit 21 judges at Step S26 whether the OK button 104 is touched, and if it is judged that the OK button is touched, judges at Step S27 whether the edited thumbnail image is the original thumbnail or additional thumbnail. On the other hand, if the OK button is not touched on the print image editing screen 90, it is judged at Step S28 whether the cancel button 103 is touched, and if touched, the screen returns to the print image select screen 52 at Step S29, whereas if not touched, the print image editing screen 90 continues to be displayed and editions continue.

If it is judged at Step S27 that the edited image is not the additional thumbnail, i.e., the edited image is the original thumbnail 85, the flow advances to Step S30, and it is judged whether the edition contents satisfy the condition of additionally displaying a thumbnail. The condition of additionally displaying a thumbnail corresponds to the case other than that edition content is only image color correction, such as red eye correction and backlight correction by the automatic correction button 101 and manual correction button 102, i.e., the case wherein processes such as addition of frames and characters and zoom and rotation of an image are executed or color correction such as red eye correction is executed together with these processes. The image color correction is intended to correct the taken image data itself regarding the original thumbnail 85, and is not intended to obtain edited image data different from the original thumbnail 85. Therefore, if image correction is performed, it is not necessary to generate and display a new additional thumbnail and make the thumbnail juxtaposed with the original thumbnail 85. Therefore, correction contents are reflected upon the taken image data of the original thumbnail 85, the resultant image data is stored in the image memory 16, and the image after correction is displayed in the thumbnail display area 61.

Figure 12:
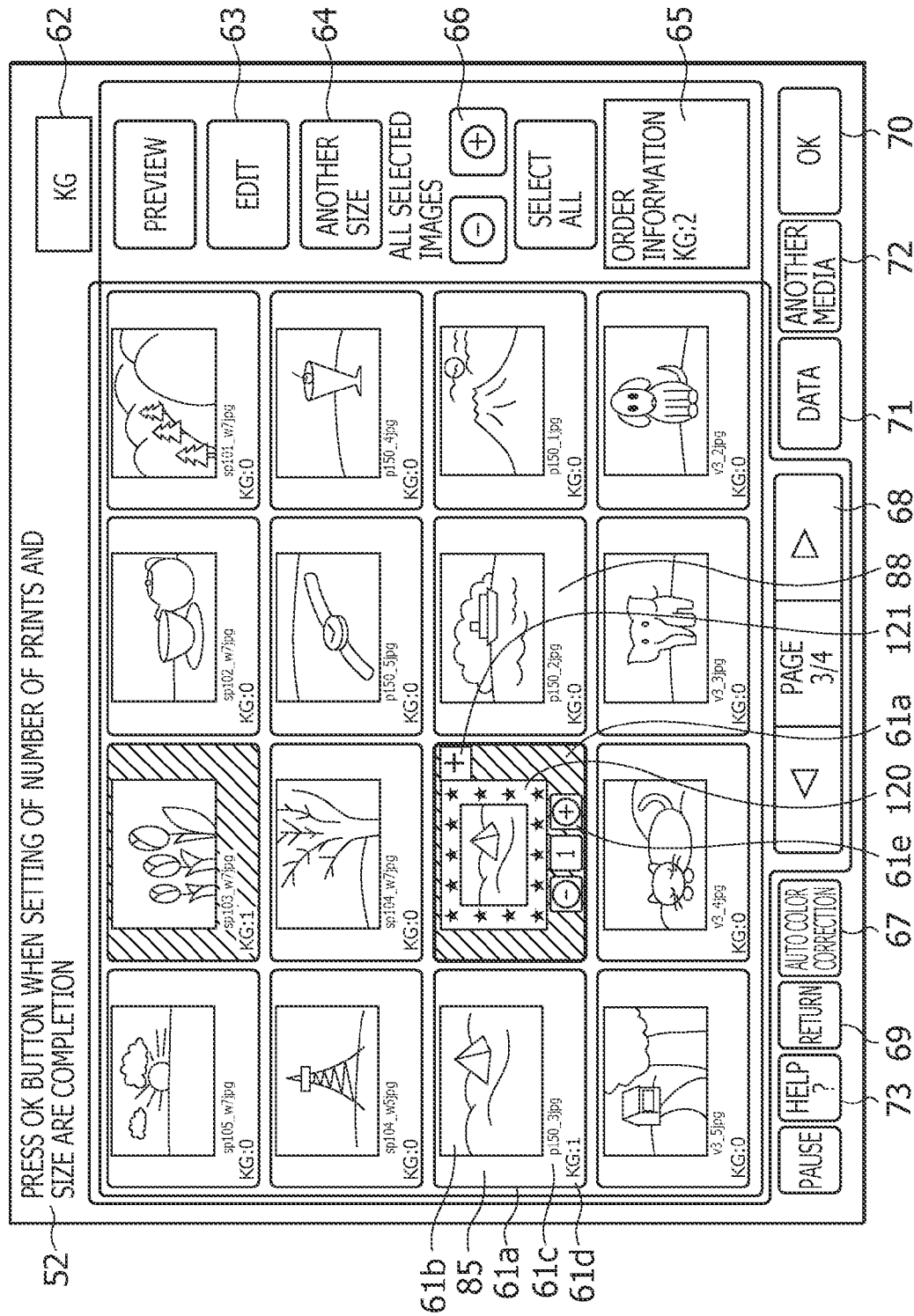
FIG. 12 is a diagram showing a print image select screen on which additional thumbnails obtained through various editions to taken images are displayed.

If it is judged at Step S30 that the condition of additionally displaying a thumbnail is satisfied, then at Step S31 the control unit 21 inserts additional thumbnail 120 of the edited image data into the thumbnail displays area 61 in a manner an additional thumbnail 120 of the edited image data can be additional displayed adjacent to the original thumbnail 85, as shown in FIG. 12. Next, at Step S32 the control unit 21 stores edited image data of the additional thumbnail 120 in the image memory 16.

Next, at Step S33 the control unit 21 transfers the number of print copies set to the original thumbnail 85 to the additional thumbnail 120. This is because it is considered that the user intends to print the edited print image. Next, at Step S34 the control unit 21 returns a display of the touch panel 15 to the print image select screen 52 as shown in FIG. 12. At this stage, the thumbnail display area 61 displays the additional thumbnail 120 representative of the thumbnail of the edited image data, adjacent to the original thumbnail 85 and set with the select state.

At Step S35 the control unit 21 adds an addition icon 121 indicating the additional thumbnail to the display frame 61a of the additional thumbnail 120, and at Step S36 displays again the thumbnail display area 61.

Displayed in the display frame 61a of the additional thumbnail 120 are the thumbnail 61b and image data name 61c of the edited image data and the print size and print copy number 61d at the default size selected for the original thumbnail 85 and the number of print copies set for the original thumbnail 85. The addition icon 121 is also displayed in the display frame 61a of the additional thumbnail 120 so that the user can easily know that the thumbnail is added later.

The number of print copies of the original thumbnail 85 is set to "0" and the select state thereof is released. This is because it is considered that the user intends to print the additional thumbnail 120 of the edited image data. In this state, the designated state may be entered by touching the original thumbnail 85, and the number of print copies may be set by using the print copy number setting buttons 61e.

Since the additional thumbnail 120 is displayed adjacent to the original thumbnail 85, a thumbnail 88 displayed previously adjacent to the original thumbnail 85 is shifted right by one and displayed adjacent to the additional thumbnail 120, and thumbnails adjacent to the thumbnail 88 are sequentially shifted right or displayed in the lower rows similarly, and the last thumbnail is shifted to the next page. The size designated for the additional thumbnail 120 is additionally displayed in the size information display area 65.

After image selection, various editions and settings of the number of print copies and the print size are completed on the print image select screen 52 and the select completion button 70 is touched, the control unit 21 collects the number of print copies and the fee of the thumbnail in the select state per each print size and displays the order confirmation screen together with the total fee on the touch panel 15. As the OK button on the order confirmation screen is touched, the control unit 21 transmits the edited image data to the printer apparatus 30, and the control unit of the printer apparatus 30 generates print data based on the image data. Thereafter, the printer apparatus 30 drives the thermal head 31, ink ribbon transport unit 34 and recording paper feeding unit 35 in accordance with the print data to print a photograph corresponding to the edited image data on paper of a designated size.

As described above, the image display apparatus 10 displays the original thumbnail 85 and the additional thumbnail 120 of the edited image obtained through editions of the taken image, adjacent to each other, on the print image select screen 52. The print copy number setting buttons 61e are displayed for both the original thumbnail 85 and additional thumbnail 120 in the select state, and different numbers of print copies may be set. The image display apparatus 10 can issue a print order of the taken image and the image obtained by editing the taken image at the same time, by one order operation.

On the other hand, if it is judged at Step S27 that the thumbnail of the edited image is the additional thumbnail 120, a further additional thumbnail is neither generated nor displayed. Namely, the additional thumbnail 120 is generated only when the original thumbnail 85 is selected and the taken image of the original thumbnail 85 is edited, and a further additional thumbnail is not generated if the additional thumbnail 120 is selected and the image of the additional thumbnail 120 is additionally edited.

If the additional thumbnail 120 is selected and additionally edited, image data after additional edition is overwritten and stored as the edited image data, at Step S37. The control unit 21 overwrites and stores the edited image data after additional edition to the image data relative to additional thumbnail stored in the image memory 16.

Next, at Step S38 the control unit 21 returns a display of the touch panel 15 from the print image editing screen 90 to print image select screen 52, and at Step S36 displays again the thumbnail display area 61. In this case, the image data name 61c, print size and print copy number 61d and addition icon 121 are maintained unchanged for the additional thumbnail 120 displayed adjacent to the original thumbnail 85 other than the fact that the thumbnail of the edited image data after additional edition is displayed. The additional thumbnail 120 is set to the select state.

The print size of the additional thumbnail 120 cannot be changed. The reason for this is because since a change in a print size is accompanied by a change in an aspect ratio, a print area becomes different, and hence the print area may become different between a synthesized image displayed in the photograph display area 91 and the printed photograph, resulting in that the intended area is not printed. This is also because some synthesized frames are not compatible with other sizes. However, the print size of the additional thumbnail 120 may be changed if an adjustment function is provided for making the synthesized image with the print image or frame is made adaptable to the changed print size depending upon the differences of print areas. In this case, a further additional thumbnail is generated and displayed for each size of the additional thumbnail 120.

However, the image display apparatus 10 can print an edited image having a size different from that of the original thumbnail 85 by generating once the additional thumbnail 86 obtained by editing the original thumbnail 85 to add a size and editing to ornament the additional thumbnail 86, because, in this case, a frame or the like corresponding to the print size of the additional thumbnail 86 is synthesized and a difference between print areas will not occur.

For example, in the state that the additional thumbnail 86 shown in FIG. 8 is designated, as the edit button 63 is touched, the screen transits to the print image editing screen 90 so that various editions are performed on the additional thumbnail 86. In this case, a print size (L size) additionally changed is displayed in the size display area 92 of the print image editing screen 90. Further, as shown in FIG. 13, since the edited image is associated with the additional thumbnail, a further additional thumbnail different from the additional thumbnail 86 of the edited image is not generated, and the edited thumbnail image is displayed for the additional thumbnail 86.

Figure 13:
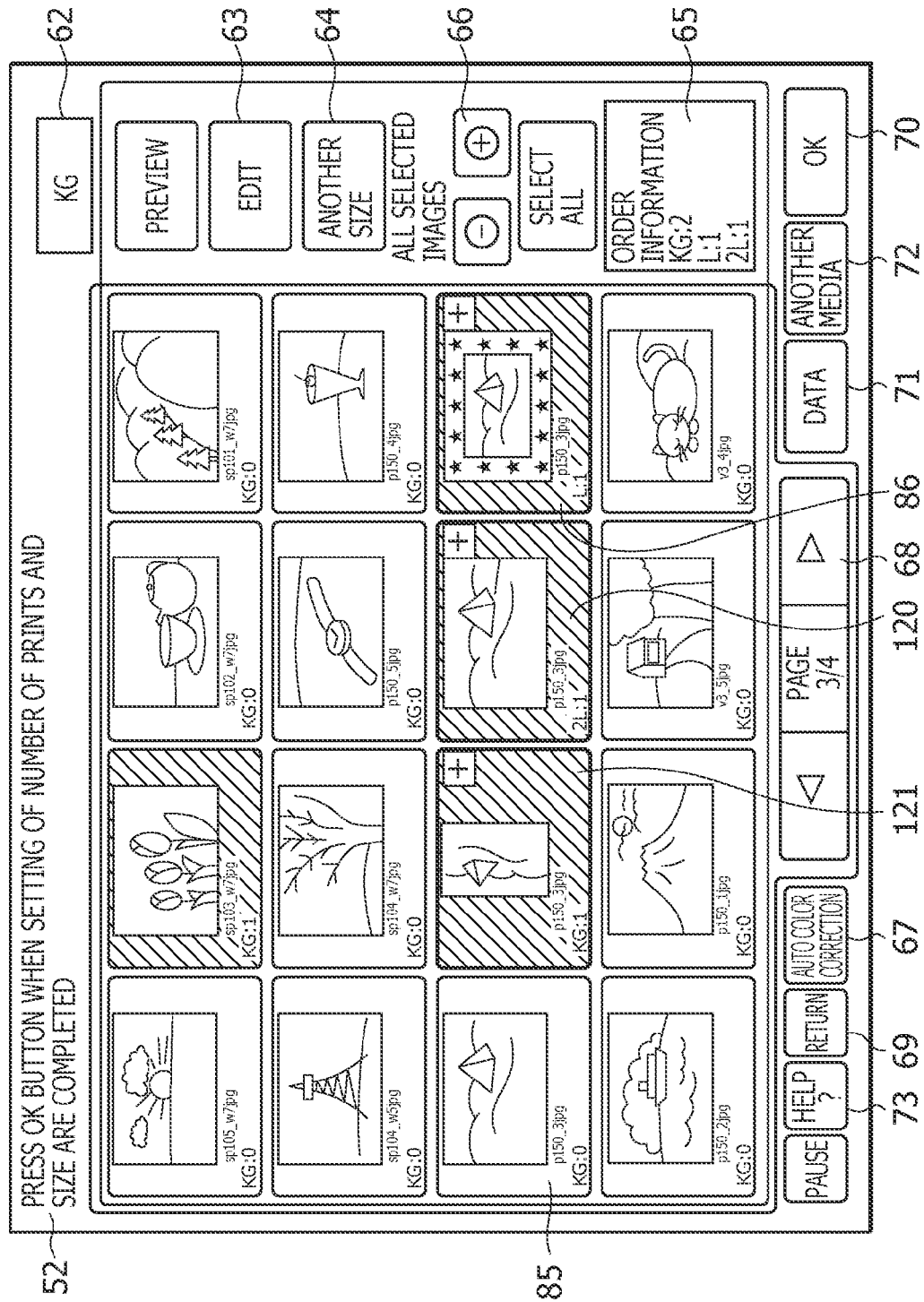
FIG. 13 is a diagram showing a print image select screen on which a plurality of additional thumbnails are generated and displayed.

From this state, as the original thumbnail 85 shown in FIG. 13 is designated and the 2 L size is selected with the additional size select dialog 80 by touching the size addition button 64, an additional thumbnail having the size 2 L same as the image of the original thumbnail 85 is additionally displayed adjacent to the original thumbnail 85. Further, if the original thumbnail 85 is designated and the edit button 63 is touched and the taken image is subjected to the zoom and rotation processes by using the print image editing screen 90, an additional thumbnail representative of a thumbnail edited at the same print size as that of the original thumbnail 85 is additionally displayed adjacent to the original thumbnail 85.

In the manner described above, as the additional thumbnails 86, 120 and 121 are sequentially and additionally displayed, the thumbnail 88 and the like adjacent to the original thumbnail 85 in FIG. 5 are sequentially shifted. A newly added one of the additional thumbnails 86, 120 and 121 is inserted adjacent to the original thumbnail 85, and each thumbnail is displayed by sequentially being shifted each time it is added. Since the original thumbnail 85 enters the select state each time it is designated, "1" is automatically set as the number of print copies. Therefore, since the number of print copies of the original thumbnail 85 is transferred, the additional thumbnail 121 is also set with the number of print copies of "1". After the additional thumbnail 121 with ornamental edition is additionally displayed, the original thumbnail 85 returns its number of print copies to "0" and its select state is released.

As described above, according to the image display apparatus 10, as a print image edited at a size different from the default size of the original thumbnail or a print image with ornamental edition of the taken image of the original thumbnail is generated, an additional thumbnail with print size change edition or ornamental edition is generated separately from the original thumbnail, and displayed together with the original thumbnail on the touch panel 15. According to the image display apparatus 10, it is possible to set independently the number of print copies to the original thumbnail and additional thumbnail and print them. It is therefore possible to set a different print size to each image and print the taken image and edit image at different sizes and by different numbers of print copies, by one order operation. The print work processes by a user can be simplified considerably.

Further, in the image print apparatus 10, if the "Border" icon is selected on the print menu screen 51, a frame is first selected, and then the selected frame and a taken image recorded in a memory card are synthesized, and the synthesized image is displayed on the print image selected screen 52. Namely, the synthesized image of the frame and taken image can be used as the original thumbnail. Accordingly, as editions are performed by designating this original thumbnail, an additional thumbnail of the synthesized image of the frame and taken image having a text can be generated and displayed together with the original thumbnail. The ornamental edition process can be simplified, for example, by generating a plurality of additional thumbnails having different messages for each person to whom a photograph is sent and printing the photographs, by one order operation.

The edit button 63 and size add button 64 of the print image select screen 52 may be disposed in each display frame 61a. The button may not be displayed in the display frame 61a of the thumbnail, but the print copy number setting buttons 61e displayed in the display frame 61a in the designated thumbnail may be displayed always outside the frame, and the number of print copies may be displayed for the designated thumbnail to increase/decrease the number of print copies.

A size addition button for adding a print size in a unified manner may be provided for all thumbnails on the print image select screen 52. In this case, all thumbnail are displayed or not displayed at all in the original thumbnail display area 81 of the additional size select dialog 80. As a print size different from the default size is selected, the additional thumbnail 86 is additionally displayed adjacent to the original thumbnail 85.

A plurality of print sizes may be set to one original thumbnail 85. Also in this case, as a print size different from the set print size is added, the additional thumbnail 86 is additionally displayed.

The print image select screen 52 may have a hierarchical display for the original thumbnail 85 and a hierarchical display for the additional thumbnails 86, 120, 121 and the like. In this case, an icon indicating that an additional thumbnail is generated in the display frame 61a of the original thumbnail 85 is added, and as the original thumbnail 85 is touched, the additional thumbnail derived from the original thumbnail 85 is displayed adjacent to the original thumbnail 85.

For various operations of the image display apparatus 10, not only the touch panel 15 but also an input device such as a mouse may be used. The print system 1 may be applied to a printer apparatus other than a print kiosk terminal.

The present invention is not limited only to the above-described embodiments, but various modifications are possible without departing from the gist of the present invention. For example, although the hardware structure is described in the embodiments, the invention is not limited thereto, but an arbitrary process may be realized by making a central processing unit (CPU) execute a computer program, or may be provided through transmission via the Internet and other transmission media.

It should be understood by those skilled in the art that various modifications, combinations, sub-combinations and alterations may occur depending on design requirements and other factors insofar as they are within the scope of the appended claims or the equivalents thereof.

What is claimed is:

1. A print system comprising:
   a printer including a printing head configured to form an image on paper, a paper feeding unit configured to transfer the paper, and a head control unit configured to control driving the printing head; and
   an image editing apparatus connected to the printer via wireless communication, the image editing apparatus including
   (1) one or more processors configured to (a) read image data of the image to be printed by the printer, (b) control a display to display a plurality of thumbnail images relating to the image data of the image to be printed by a printer, a plurality of display frames corresponding to the thumbnail images, a plurality of image data names of the image data, a print option menu including an icon for printing the image with a template frame, and an edit button for editing the image, (c) control, in response to a designation by a user, changing a background color of a first display frame corresponding to a first thumbnail image designated by the user to set the designated thumbnail image to a select state, (d) control a display to display, in a case that the edit button is selected by the user with the designated thumbnail image the selected state, a print image edit screen for editing the designated image corresponding to the designated thumbnail image, (e) perform edit processing on the designated image based on an input by the user, and (f) output the image data and edit data obtained through the edit processing to the printer, and (2) a memory configured to store data for displaying the thumbnail images on the display or the edit data, wherein, the edit processing includes at least a process of adding a text to the designated image, a process of correcting a red eye in the designated image, and a process of converting the designated image to a monochromatic color image or a sepia color image.

2. The print system according to claim 1, wherein the one or more processors are configured to:

change, in response to an additional designation by the user, a background color of a second display frame corresponding to a second thumbnail image designated by the user; and maintain the changed background color of the first display frame corresponding to the first thumbnail image designated by the user.

3. The print system according to claim 1, wherein the one or more processors are configured to add, to the display frame of the thumbnail image, a mark indicating that there is the edit data corresponding to the thumbnail image.

4. The print system according to claim 1, wherein the one or more processors are configured to control a display to display a print copy number setting button in response to the designation by the user.

5. The print system according to claim 4, wherein a print copy number setting button includes + and − buttons for increasing or decreasing the number of print copies.

6. The print system according to claim 5, wherein the one or more processors are configured to control a display to display a print size and a print copy number.

7. The print system according to claim 6, wherein the one or more processors are configured to control a display to display an automatic color correction button for executing in a predetermined manner color correction of the designated image corresponding to the designated thumbnail image.

8. The print system according to claim 1, wherein the display includes a touch panel for the input by the user.

9. The print system according to claim 1, wherein the edit processing includes a process of rotating the designated image.

10. The print system according to claim 1, wherein the print option menu includes an icon for printing at least two images selected from the images as one print image.

11. An image display method for displaying an image to be printed by the printer, comprising steps executed by circuitry of:

display a plurality of thumbnail images relating to images to be printed by a printer, a plurality of display frames corresponding to thumbnail images, a plurality of image data names of the images, a print option menu including an icon for printing the images with a template frame, and an edit button for editing the images;

control, in response to a designation by a user, changing a background color of a first display frame corresponding to a first thumbnail image designated by the user to set the image corresponding to the designated thumbnail image to a select state;

control a display to display, in a case that the edit button is selected by the user in the selected state, a print image edit screen for editing the designated image corresponding to the designated thumbnail image; and perform an edit processing on the designated image based on an input by the user; and wherein, the edit processing includes at least a process of adding a text to the designated image, a process of correcting a red eye in the designated image, and a process of converting the designated image to a monochromatic color image or a sepia color image.

12. A non-transitory memory medium having stored thereon image display machine executable program instructions causing circuitry to:

display a plurality of thumbnail images relating to images to be printed by a printer, a plurality of display frames corresponding to thumbnail images, a plurality of image data names of the images, a print option menu including an icon for printing the images with a template frame, and an edit button for editing the images;

control, in response to a designation by a user, changing a background color of a first display frame corresponding to a first thumbnail image designated by the user to set the image corresponding to the designated thumbnail image to a select state;

control a display to display, in a case that the edit button is selected by the user in the selected state, a print image edit screen for editing the designated image corresponding to the designated thumbnail image; and perform an edit processing on the designated image based on an input by the user; and wherein, the edit processing includes at least a process of adding a text to the designated image, a process of correcting a red eye in the designated image, and a process of converting the designated image to a monochromatic color image or a sepia color image.

13. An information processing apparatus, connected to a printer via wireless communication, comprising:

(1) one or more processors configured to (a) read image data of the image to be printed by the printer, (b) control a display to display a plurality of thumbnail images relating to the image data of the image to be printed by a printer, a plurality of display frames corresponding to the thumbnail images, a plurality of image data names of the image data, a print option menu including an icon for printing the image with a template frame, and an edit button for editing the image, (c) control, in response to a designation by a user, changing a background color of a first display frame corresponding to a first thumbnail image designated by the user to set the designated thumbnail image to a select state, (d) control a display to display, in a case that the edit button is selected by the user with the designated thumbnail image the selected state, a print image edit screen for editing the designated image corresponding to the designated thumbnail image, and (e) perform edit processing on the designated image based on an input by the user, and (f) output the image data and edit data obtained through the edit processing to the printer; and (2) a memory configured to store data for displaying the thumbnail images on the display or the edit data, wherein, the edit processing includes at least a process of adding a text to the designated image, a process of correcting a red eye in the designated image, and a process of converting the designated image to a monochromatic color image or a sepia color image.

\* \* \* \* \*